UNITED STATES PATENT OFFICE 2,585,116

METHOD OF MANUFACTURING BRICK FROM NONREFRACTORY RAW CLAY

Hugo Alfred Grönroos, Stallarholmen, Sweden, assignor of one-half to Otto Werner Hacklin, Stockholm, Sweden No Drawing. Application October 8, 1946, Serial No. 702,064. In Sweden October 25, 1945

2 Claims. (Cl. 106—72)

The present invention relates to the production of bricks and similar building materials, whereby non-refractory brick clays in particular are heated and while heated are mixed with an additional quantity of brick clay, hereafter referred to as raw clay, whereupon after being rendered homogeneous, crushed and moistened the mixture is finally moulded into raw bricks and fired completely. A considerable advantage is obtained with this method by reason of the fact that the bricks can be produced in a rapid, continuous working sequence, lengthy air drying being eliminated, so that a higher rate of output is possible with lower working costs. Furthermore, in accordance with this method, it is possible to employ much heavier forms of clay, which was not possible heretofore.

Experiments extending over many years, on which the present invention is based, have shown that in order to produce a high-grade brick it is necessary to carry out pre-heating of the clay at temperatures which are lower than the temperatures at which the moulded bricks are finally fired. Sintering of the material is thereby avoided with such pre-heating.

When heating raw clay to a given temperature a process of conversion which is partly physical and partly chemical takes place the extent of which is dependent upon the time during which the clay is subjected to the heating. Different forms of clay change in character at different temperatures and heating times as may be determined relatively easily by means of preliminary experiments.

Heating should take place relatively rapidly and preferably should not take place over a period to exceed one hour. Good results have been obtained with heating times varying between 15 minutes up to 2–3 hours. The time most commonly employed is 1 hour however. Heating should preferably be carried out at a temperature of 850–920° C. As is well known, this temperature lies slightly below the temperature at which bricks moulded from semi-plastic raw clay should be subsequently fired.

According to the present invention the clay is conveyed forward through a furnace, such as a rotary tunnel kiln at a temperature which is raised from 300–400° C. upwards. Cracks are formed and the clay disintegrates. The small particles thus obtained are rapidly converted and the structure changed with each temperature step passed through in the furnace. At 400° C. the mechanically combined water begins to be driven off and the organic substances are carbonised. Changes begin to occur in the character of the clay when it reaches the zone where the temperature is approximately 525° C. The clay nevertheless continues to retain an appreciable part of its plastic properties. From the temperature zone of 525° C. the clay passes through the hottest zone of the furnace in which the temperature is 850–920° C. In the last section of the furnace the temperature of the heated material drops to approximately 800–850° C. In the above-described heating system the clay has lost its plastic properties and has received a red colour due to the iron compounds which have been converted to iron oxide.

From the rotary kiln the heated clay falls down directly into a shaking receptacle which is set in horizontal reciprocating movement in jerks, being transported from this point in weighed quantities to a pug mill or the like. At the same time raw clay, such as moist pit clay, is added by a measuring device which feeds the raw clay into the heated clay in definite quantities. Here the heated clay and the raw clay, for example 1 part by weight raw clay to 1–2 parts by weight heated clay, are together subjected to preliminary coarse crushing and mixing. The red hot clay heats up the added moist pit clay during the mixing and crushing operation to about 200° C. The water passes off in the form of steam and the water content in the raw clay is caused to decrease owing to the effect of the heated clay so that a simultaneous conversion of the raw clay takes place, the small particles of which are disintegrated. Furthermore, the clay changes its character and thus also loses a considerable part of its plastic properties which permits the addition of a larger quantity of raw clay, for example equal parts of different forms of clay, to the heated clay without the formation of cracks during the subsequent rapid drying and firing of the raw brick.

From the pug mills the coarsely crushed, dry material passes at a temperature of about 80° C. to sifting mills. Here it is mixed and ground to the desired degree of fineness, being then caused to pass through sifting apertures at the bottom of the pug mill whereupon it is transported to suitable storage places, such as silos or the like.

From these silos the material is fed out to a moistening and mixing machine in which it is brought to a suitably degree of moisture. From the mixing and moistening machines the material is conveyed, along a channel for example, to the presses. On leaving the presses the moulded bricks may be subjected to forced rapid drying, heating, firing and cooling in continuous and rapid succession.

The rapid pre-heating of the raw clay, that is to say, the short heating period, is rendered possible by employing an inclined rotary furnace for example, and may be regulated by selecting a suitable speed of rotation.

According to this method very heavy clays may be employed which have a particularly strong tendency to develop cracks when drying and which may contain at least 12.5 to 18% loam, silicic acid varying between 55 and 67%, lime between 4.4 and 10.9%, iron oxide between 4.4 and 7.5% and alkalis between 2 and 6%.

The method described above only relates to one form for carrying out the invention but it is clear that the latter is not limited to this one form of construction and that modifications may be introduced within the scope of the invention.

What I claim is:

1. In a method of manufacturing bricks from non-refractory raw clay, the steps of preheating a portion of the clay for a period of fifteen minutes to three hours to a temperature which is in the range of 850° C. to 920° C. but below the sintering point of the clay, immediately adding the preheated clay at substantially the stated temperature to unheated raw clay in the proportions between 1 to 1 and 1 to 2 and immediately crushing and mixing the clays whereby the specific heat of the preheated clay raises the temperature of the mixture to a temperature of the order of 200° C., driving off moisture from the unheated raw clay and effecting a physical and chemical conversion in the character of the clay to a less plastic form.

2. A method of manufacturing bricks from non-refractory raw clay, comprising the steps of rapidly preheating a portion of the clay for a period of fifteen minutes to two hours to a temperature in the range of 850° C. to 920° C. but below the sintering point of the clay, immediately adding the preheated clay at substantially said temperature to unheated moist raw clay in the proportion between 1 to 1 and 1 to 2 and immediately crushing and mixing the preheated and unheated portions of the clay whereby the specific heat of the preheated clay raises the temperature of the mixture to a temperature of the order of 200° C., driving off moisture from the unheated raw clay and effecting a physical and chemical change in the character of the clay to a less plastic form, pressing the clay mixture into bricks and firing the bricks at sintering temperature.

HUGO ALFRED GRÖNROOS.

REFERENCES CITED

The following references are of record in the file of this patent:

UNITED STATES PATENTS

| Number | Name | Date |
|---|---|---|
| 392,084 | Krystoffovitch | Oct. 30, 1888 |
| 491,074 | Brewer | Feb. 7, 1893 |

FOREIGN PATENTS

| Number | Country | Date |
|---|---|---|
| 18,911 | Great Britain | 1889 |
| 15,834 | Great Britain | 1894 |
| 417,124 | Great Britain | Sept. 24, 1934 |